United States Patent
Khan et al.

(10) Patent No.: US 8,243,693 B2
(45) Date of Patent: Aug. 14, 2012

(54) APPARATUS AND METHOD FOR BROADCAST PILOT TRANSMISSION IN A WIRELESS COMMUNICATION NETWORK

(75) Inventors: Farooq Khan, Allen, TX (US); Jiann-An Tsai, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 893 days.

(21) Appl. No.: 11/762,592

(22) Filed: Jun. 13, 2007

(65) Prior Publication Data

US 2008/0032744 A1 Feb. 7, 2008

Related U.S. Application Data

(60) Provisional application No. 60/834,619, filed on Aug. 1, 2006.

(51) Int. Cl.
*H04B 7/216* (2006.01)
(52) U.S. Cl. ............... 370/335; 370/310.1; 370/203; 455/562.1
(58) Field of Classification Search .......... 455/82, 455/83, 550.1–553.1, 562.1; 370/310.1–350, 370/203
See application file for complete search history.

(56) References Cited

U.S. PATENT DOCUMENTS

| | | | |
|---|---|---|---|
| 2005/0063298 A1* | 3/2005 | Ling et al. | 370/208 |
| 2005/0181799 A1* | 8/2005 | Laroia et al. | 455/450 |
| 2005/0259584 A1* | 11/2005 | Chen et al. | 370/238 |
| 2007/0011503 A1* | 1/2007 | Kitani et al. | 714/704 |
| 2007/0104151 A1* | 5/2007 | Papasakellariou et al. | 370/335 |
| 2007/0183353 A1* | 8/2007 | Malladi | 370/312 |
| 2007/0250638 A1* | 10/2007 | Kiran et al. | 709/236 |
| 2008/0198785 A1* | 8/2008 | Huang et al. | 370/312 |
| 2009/0316614 A1* | 12/2009 | Kim et al. | 370/312 |

* cited by examiner

*Primary Examiner* — Jean Gelin
*Assistant Examiner* — Michael Nguyen (57) ABSTRACT

A base station that communicates with subscriber stations in an OFDM wireless network. The base station transmits broadcast data and unicast data to the subscriber stations from a plurality of antennas using multiple-input, multiple-output (MIMO) techniques. The base station transmits a first broadcast pilot signal from a first antenna orthogonally to at least one of: i) a first unicast pilot signal transmitted from the first antenna; ii) a second unicast pilot signal transmitted from a second antenna; iii) a second broadcast pilot signal transmitted from the second antenna; and iv) superimposed broadcast data traffic and unicast data traffic transmitted from the first and second antennas. The base station uses orthogonal subcarriers or orthogonal time slots.

25 Claims, 11 Drawing Sheets

APPARATUS AND METHOD FOR BROADCAST PILOT TRANSMISSION IN A WIRELESS COMMUNICATION NETWORK

CROSS-REFERENCE TO RELATED APPLICATIONS AND CLAIMS OF PRIORITY

This application is related to U.S. Provisional Patent No. 60/834,619, filed Aug. 1, 2006, entitled "Broadcast Pilot Transmission and Channel Estimation In A Wireless Communication System". U.S. Provisional Patent No. 60/834,619 is assigned to the assignee of this application and is hereby incorporated by reference as if fully set forth herein. The present application hereby claims priority under 35 U.S.C. §119(e) to U.S. Provisional Patent No. 60/834,619.

TECHNICAL FIELD OF THE INVENTION

The present application relates generally to wireless communications and, more specifically, to apparatuses and methods for transmitting broadcast pilot signals in a multicarrier wireless network.

BACKGROUND OF THE INVENTION

OFDM networks support the transmission of both broadcast traffic, intended for multiple subscriber stations (i.e., user devices), and unicast traffic, intended for a single subscriber station. Conventional OFDM networks time-multiplex broadcast and unicast traffic in the downlink (i.e., forward channels) by transmitting broadcast and unicast traffic in different downlink transmission time intervals. Accordingly, broadcast traffic may be transmitted in a first transmission time interval (TTI), while unicast traffic is transmitted in at least one TTI other than the first TTI. In general, the duration of each TTI is fixed. The number of OFDM symbols within a TTI may be different for broadcast traffic and unicast traffic. In general, a smaller number of OFDM symbols are carried in a broadcast TTI in order to allow for a longer cyclic prefix (CP).

In broadcast transmission over a cellular system, the same information content is transmitted simultaneously from all of the base stations of the cellular network or from a subset of all of the base stations. In the case of broadcast transmission from a subset of the base stations, the base stations transmitting the same content belong to a broadcast zone. Therefore, a receiver device (e.g., subscriber station, mobile station, mobile terminal, etc.) receiving the broadcast content potentially may receive signals from all or many of the base stations in the broadcast zone.

If all the base stations in the broadcast zone are synchronized and OFDM is used for transmission, a single frequency network (SFN) operation may be realized. In an SFN-based broadcast system, the signals from all the base stations in the broadcast zone may be collected at the receiver device without any interference apart from the background noise, plus any interference from cells not belonging to the broadcast zone. Therefore, signal-to-interference-plus-noise ratio (SINR) of the received broadcast signal can be improved. This allows for higher data rates and better recovery of the broadcast information.

Multiple Input Multiple Output (MIMO) schemes use multiple transmit antennas and multiple receive antennas to improve the capacity and reliability of a wireless communication channel. A MIMO system promises linear increase in capacity with the factor K, where K is the minimum of number of transmit (M) antennas and receive (N) antennas (i.e., K=min(M,N)). For example, four different data streams may be transmitted separately from the four transmit antennas. The transmitted signals are received at the four receive antennas. Some form of spatial signal processing is performed on the received signals to recover the four transmitted data streams. An example of spatial signal processing is V-BLAST, which uses successive interference cancellation to recover the transmitted data streams. Other variants of MIMO systems include schemes that perform some kind of space-time coding across the transmit antennas (e.g., D-BLAST) and also beam-forming techniques, such as spatial division multiple access (SDMA).

Good channel estimation is a key to the performance of any MIMO scheme. The MIMO channel estimation consists of estimating the channel gain and phase information for links from each of the transmit antennas to each of the receive antennas. The channel for an M×N MIMO system consists of a M×N matrix:

$$H = \begin{bmatrix} a_{11} & a_{12} & \ldots & a_{1N} \\ a_{21} & a_{22} & \ldots & a_{2N} \\ \vdots & \vdots & \ldots & \vdots \\ a_{M1} & a_{M2} & \ldots & a_{MN} \end{bmatrix}$$

where $a_{ij}$ represents the channel gain from transmit antenna i to receive antenna j. In order to enable the estimations of the elements of the MIMO channel matrix, separate pilots may be transmitted from each of the transmit antennas.

U.S. patent application Ser. No. 11/414,814, filed May 1, 2006 and entitled "Apparatus And Method For Broadcast Superposition And Cancellation In A Multi-Carrier Wireless Network" discloses an apparatus and a method whereby broadcast and unicast traffic use the same subcarrier resources (or tones) in an OFDMA system. U.S. patent application Ser. No. 11/414,814 is assigned to the assignee of the present invention and is hereby incorporated by reference as if fully set forth herein. According to the teachings of U.S. patent application Ser. No. 11/414,814, the broadcast traffic is first decoded and cancelled before decoding of the unicast traffic takes place.

U.S. patent application Ser. No. 11/783,594, filed Apr. 23, 2007 and entitled "System And Method For Superposition Coding And Interference Cancellation In A MIMO System" discloses a system and method whereby MIMO broadcast transmissions are superimposed on MIMO unicast transmissions. U.S. patent application Ser. No. 11/783,594 is assigned to the assignee of the present invention and is hereby incorporated by reference as if fully set forth herein. According to the teachings of U.S. patent application Ser. No. 11/783,594, the MIMO broadcast traffic is first decoded and cancelled before decoding of the MIMO unicast traffic takes place. An effective cancellation operation requires reliable channel estimates and hence there is a need to improve the channel estimation performance in a system where broadcast and unicast traffics are superimposed.

However, in the conventional (or prior art) OFDM networks that incorporate MIMO transmission techniques, the broadcast pilot signals are transmitted at the same power as the broadcast traffic signals. As a result, the system experiences poor channel estimation performance and degraded system capacity.

Therefore, there is a need for improved OFDM (or OFDMA) transmission systems that make better use of the available downlink transmit power. In particular, there is a need for OFDM/OFDMA networks that use MIMO antenna systems to transmit superimposed broadcast and unicast data and that provide improved channel estimation performance and improved system capacity.

SUMMARY OF THE INVENTION

In one embodiment of the present disclosure, a base station is provided for use in an orthogonal frequency division multiplexing (OFDM) wireless network that communicates with subscriber stations in a coverage area of the OFDM wireless network. The base station transmits broadcast data and unicast data to the subscriber stations from a plurality of antennas using multiple-input, multiple-output (MIMO) techniques. The base station transmits a first broadcast pilot signal from a first antenna orthogonally to at least one of: i) a first unicast pilot signal transmitted from the first antenna; ii) a second unicast pilot signal transmitted from a second antenna; iii) a second broadcast pilot signal transmitted from the second antenna; and iv) superimposed broadcast data traffic and unicast data traffic transmitted from the first and second antennas.

In another embodiment, a method is provided for use in a base station of an orthogonal frequency division multiplexing (OFDM) wireless network that communicates with subscriber stations. The method transmits broadcast data and unicast data from the base station to the subscriber stations from a plurality of antennas using multiple-input, multiple-output (MIMO) techniques. The method comprises the steps of: transmitting a first broadcast pilot signal from a first antenna; and transmitting at least one of: i) a first unicast pilot signal transmitted from the first antenna; ii) a second unicast pilot signal transmitted from a second antenna; iii) a second broadcast pilot signal transmitted from the second antenna; and iv) superimposed broadcast data traffic and unicast data traffic transmitted from the first and second antennas. The first broadcast pilot signal is transmitted orthogonally to the first unicast pilot signal, the second unicast pilot signal, the second broadcast signal, and the superimposed broad and unicast data traffic.

In still another embodiment, a subscriber station is provided for use in an orthogonal frequency division multiplexing (OFDM) wireless network. The subscriber station receives broadcast data and unicast data transmitted by a base station from a plurality of antennas using multiple-input, multiple-output (MIMO) techniques. The subscriber station further receives and detects: i) a first broadcast pilot signal transmitted from a first antenna of the base station; ii) a first unicast pilot signal transmitted from the first antenna of the base station; iii) a second unicast pilot signal transmitted from a second antenna of the base station; iv) a second broadcast pilot signal transmitted from the second antenna of the base station; and v) superimposed broadcast data traffic and unicast data traffic transmitted from the first and second antennas of the base station. The first broadcast pilot signal is transmitted orthogonally to the second broadcast pilot signal, the first and second unicast pilot signals, and the superimposed broadcast data traffic and unicast data traffic.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

In advantageous embodiments, the OFDM/OFDMA wireless networks discussed herein use base stations that transmit superimposed broadcast and unicast traffic according to the embodiments described in U.S. patent application Ser. No. 11/414,814 and U.S. patent application Ser. No. 11/783,594. U.S. patent application Ser. Nos. 11/414,814 and 11/783,594 were incorporated by reference above.

Figure 1:
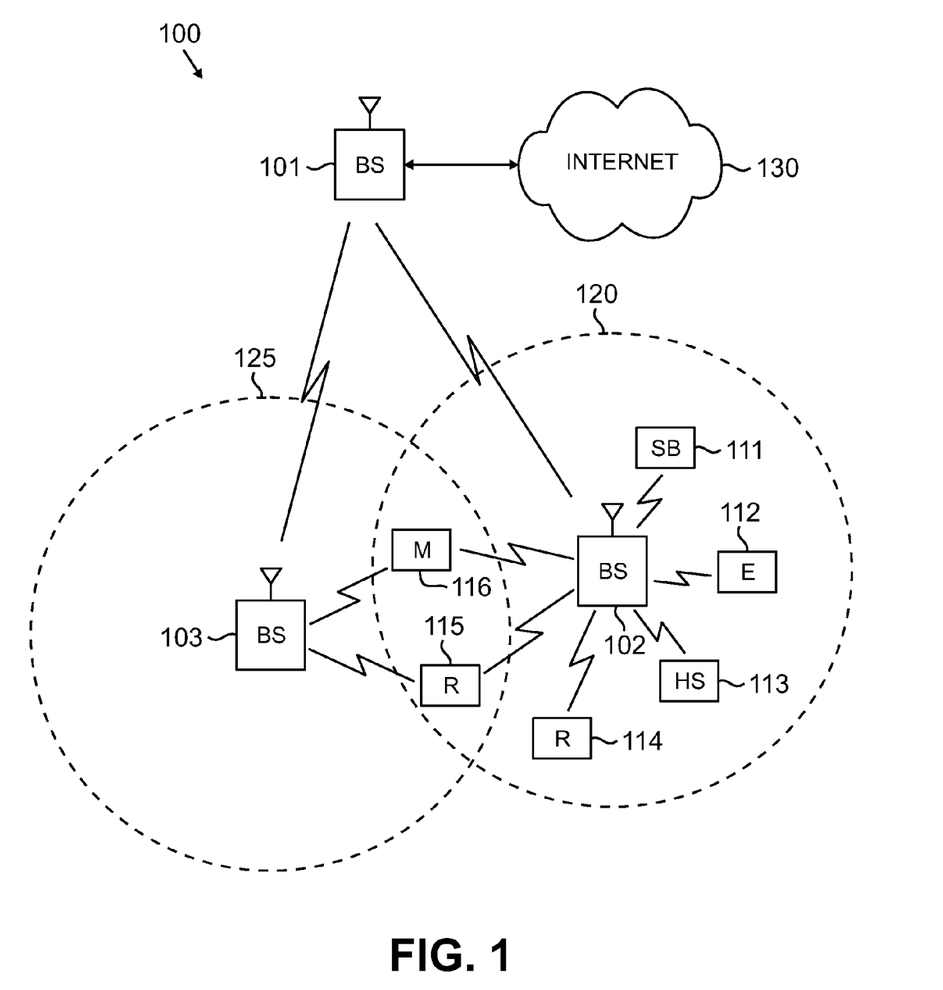
FIG. 1 illustrates an exemplary wireless network that transmits broadcast and unicast pilot signals in the downlink according to the principles of the present disclosure.

FIG. 1 illustrates exemplary wireless network 100, that transmits broadcast and unicast pilot signals in the downlink according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (perhaps via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (perhaps via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2:
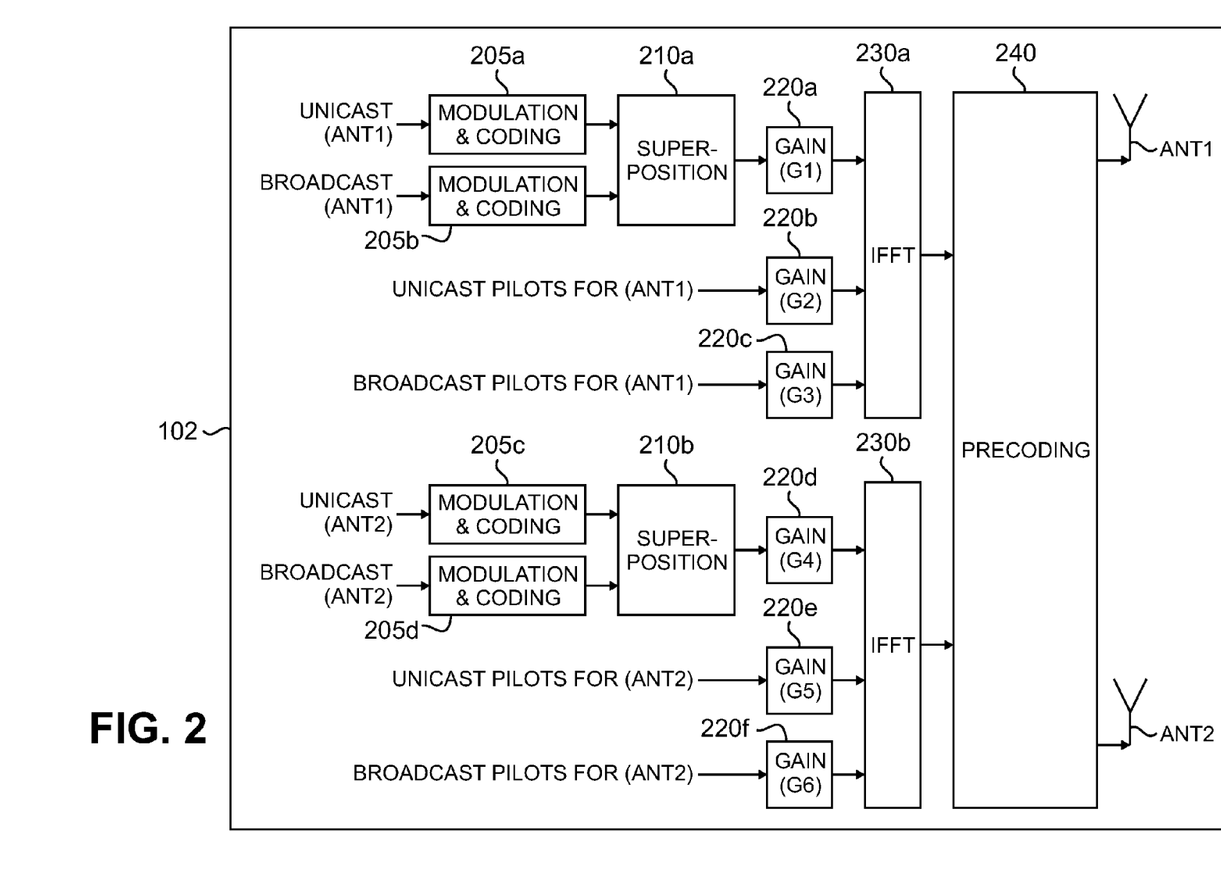
FIG. 2 is a high-level diagram of an OFDM base station that transmits broadcast and unicast pilot signals according to the principles of the present disclosure.

FIG. 2 is a high-level diagram of base station 102 according to one embodiment of the disclosure. Base station 102 is implemented according to the principles of U.S. patent application Ser. Nos. 11/414,814 and 11/783,594, which were incorporated by reference above. In particular, base station 102 is capable of transmitting broadcast and unicast traffic using the same subcarrier resources (or tones), as shown in the various embodiments described in U.S. patent application Ser. No. 11/414,814. More particularly, base station 102 implements a MIMO transmission technique that superimposes MIMO broadcast traffic on MIMO unicast traffic, as shown in the various embodiments described in U.S. patent application Ser. No. 11/783,594.

Base station 102 comprises modulation and coding blocks 205a-205d, superposition blocks 210a and 210b, gain blocks 220a-220f, inverse Fast Fourier Transform (IFFT) blocks 230a and 230b, and optional preceding block 240, and a MIMO antenna array that includes representative antennas ANT1 and ANT2. The use of two antennas in FIG. 2 to perform MIMO transmission is by way of illustration only and should not be construed to limit the scope of the present disclosure. In general, base station 102 may use N transmit antenna to perform MIMO transmissions to one or more subscriber stations. Base station 102 additionally comprises serial-to-parallel (S-P) blocks and parallel-to-serial (P-S) blocks (not shown) at the inputs and outputs of IFFT blocks 230a and 230b. For clarity, the S-P and P-S blocks are not shown, but are assumed to be integral parts of IFFT blocks 230a and 230b. Additionally, base station 102 comprises add cyclic prefix blocks that add cyclic prefixes to the serial data from IFFT blocks 230a and 230b.

Furthermore, in advantageous embodiments of the present disclosure, the component blocks of base station (BS) 102 may be reconfigurable devices that may be adapted to operate under different standards. By way of example, IFFT blocks 230a and 230b may be configured for different block sizes, N. Also, by way of example, modulation and coding blocks 205a-205d may be reconfigurable to apply different types of coding and modulation to the received unicast and broadcast data. Gain blocks 220a-220f may be, for example, multipliers or amplifiers capable of scaling input signals by selectable gain factors G1-G6, respectively.

In the illustrated embodiment in FIG. 2, base station 102 uses MIMO transmission techniques to transmit both unicast data traffic and broadcast data traffic from both antenna ANT1 and antenna ANT2. Furthermore, base station 102 uses MIMO transmission techniques to transmit both unicast pilot signals and broadcast pilot signals from both antenna ANT1 and antenna ANT2.

Modulation and coding block 205a receives a stream of unicast data directed to antenna ANT1 and encodes the unicast data according to a predetermined encoding algorithm, such as Turbo coding or Viterbi coding. Modulation and coding block 205a then applies a predetermined modulation scheme (e.g., QPSK, 16 QAM, 64-QAM, etc.) to the encoded unicast data. Similarly, modulation and coding block 205b receives a stream of broadcast data directed to antenna ANT1 and encodes the broadcast data according to a predetermined encoding algorithm, such as Turbo coding or Viterbi coding. Modulation and coding block 205b then applies a predetermined modulation scheme (e.g., QPSK, 16 QAM, 64-QAM, etc.) to the encoded broadcast data. The selected modulation and encoding schemes for unicast traffic and broadcast traffic may be different.

Next, superposition block 210a receives the encoded and modulated unicast data and broadcast data from modulation and coding blocks 205a and 205b and superimposes the MIMO unicast data and MIMO broadcast data according to the principles and embodiments described in U.S. patent application Ser. No. 11/783,594. Gain block 220a then scales the superimposed unicast and broadcast data traffic from superposition block 210a by an adjustable gain factor, G1.

Gain block 220b receives unicast pilot signals to be transmitted from antenna ANT1 and scales the unicast pilot signals by an adjustable gain factor, G2. Similarly, gain block 220c receives broadcast pilot signals to be transmitted from antenna ANT1 and scales the broadcast pilot signals by an adjustable gain factor, G3. IFFT block 230a receives the scaled, superimposed unicast and broadcast data traffic from gain block 220a and receives the scaled unicast and broadcast pilot signals from gain blocks 220b and 220c and performs a size-N inverse Fast Fourier Transform (IFFT) operation. The output of IFFT block 230a is then precoded by optional preceding block 240 prior to transmission from antenna ANT1.

Unicast and broadcast data traffic and unicast and broadcast pilot signals directed to antenna ANT2 are processed in a similar manner to that described above. Modulation and coding block 205c receives a stream of unicast data directed to antenna ANT2 and encodes the unicast data according to a predetermined encoding algorithm, such as Turbo coding or convolutional coding. Modulation and coding block 205c then applies a predetermined modulation scheme (e.g., QPSK, 16 QAM, 64-QAM, etc.) to the encoded unicast data.

Modulation and coding block 205d receives a stream of broadcast data directed to antenna ANT2 and encodes the broadcast data according to a predetermined encoding algorithm, such as Turbo coding or convolutional coding. Modulation and coding block 205d then applies a predetermined modulation scheme (e.g., QPSK, 16 QAM, 64-QAM, etc.) to the encoded broadcast data. The selected modulation and encoding schemes for unicast traffic and broadcast traffic may be different.

Next, superposition block 210b receives the encoded and modulated unicast data and broadcast data from modulation and coding blocks 205c and 205d and superimposes the MIMO unicast data and MIMO broadcast data according to the principles and embodiments described in U.S. patent application Ser. No. 11/783,594. Gain block 220d then scales the superimposed unicast and broadcast data traffic from superposition block 210b by an adjustable gain factor, G4.

Gain block 220e receives unicast pilot signals to be transmitted from antenna ANT2 and scales the unicast pilot signals by an adjustable gain factor, G5. Similarly, gain block 220f receives broadcast pilot signals to be transmitted from antenna ANT2 and scales the broadcast pilot signals by an adjustable gain factor, G6. IFFT block 230b receives the scaled, superimposed unicast and broadcast data traffic from gain block 220d and receives the scaled unicast and broadcast pilot signals from gain blocks 220e and 220f and performs a size-N inverse Fast Fourier Transform (IFFT) operation. The output of IFFT block 230b is then precoded by optional preceding block 240 prior to transmission from antenna ANT2.

In the descriptions above, preceding block 240 is said to be optional because preceding may not be applied at all or may be selectively applied to only some of the unicast data, broadcast data, unicast pilot signals, and broadcast pilot signals. Also, preceding block 240 may be implemented before IFFT blocks 230a and 230b, rather than after. The input signals to preceding block 240 represent virtual antenna inputs that are distributed across antennas ANT1 and ANT2.

Figure 3:
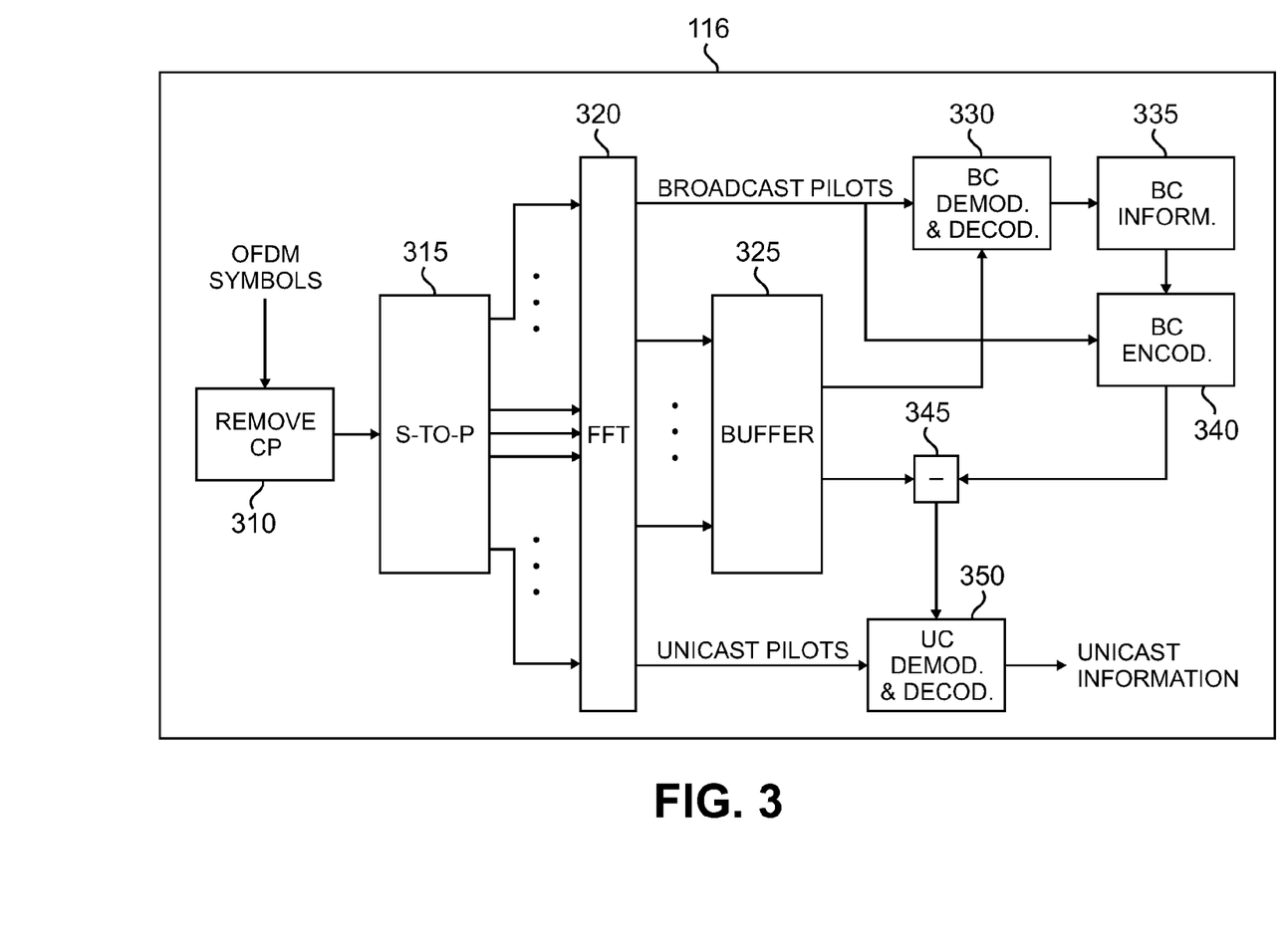
FIG. 3 illustrates an exemplary subscriber station in greater detail according to one embodiment of the disclosure.

FIG. 3 illustrates exemplary subscriber station (SS) 116 in greater detail according to one embodiment of the present disclosure. FIG. 3 illustrates the functional blocks that perform interference cancellation of the broadcast signals in the OFDM receiver of SS 116. SS 116 is implemented according to the principles of U.S. patent application Ser. Nos. 11/414,814 and 11/783,594. In particular, SS 116 is capable of receiving broadcast and unicast traffic using the same subcarrier resources (or tones) and in which MIMO broadcast traffic may be superimposed on MIMO unicast traffic.

After down-conversion (not shown) of the received RF signal, remove cyclic prefix (CP) block 310 receives the incoming OFDM symbols and removes the cyclic prefix associated with each OFMD symbol. Serial-to-parallel block 315 converts the serial OFDM symbol to parallel format and applies the OFDM symbols to the inputs of Fast Fourier Transform (FFT) block 320. FFT block 320 performs an FFT operation and the data output by FFT block 320 is stored in buffer 325 for further processing.

In one processing step, broadcast demodulation and decoding block 330 receives the broadcast pilot signals from FFT block 320 and demodulates and decodes the broadcast information from the data in buffer 325. The decoded broadcast information is stored in broadcast information buffer 335. In another processing step, broadcast encoding block 340 re-encodes the decoded broadcast information in buffer 335 using the broadcast pilot estimates from FFT block 320. In essence, this operation reconstructs the broadcast signal. Cancellation block 345 then cancels (i.e., subtracts) the reconstructed broadcast signal from the buffered overall signal in buffer 325, thereby removing the effect of the broadcast signal from the overall signal. Thus, the output of cancellation block 345 is the resulting overall unicast signal.

Unicast demodulation and decoding block 350 then demodulates and decodes the resulting unicast signal from cancellation block 345 using the unicast pilot estimates from FFT block 320. SS 116 then uses the decoded unicast signal from unicast demodulation and decoding block 350. Ideally, the broadcast and the unicast streams are thereby recovered error free.

The present disclosures introduces a transmission technique wherein broadcast pilots signals and unicast pilot signals (or other reference signals) are transmitted on subcarrier or time resources that are orthogonal to each other and orthogonal to the subcarrier or time resources that are used to transmit superimposed unicast and broadcast traffic. Using this transmission technique, the broadcast pilot signals only see background noise as interference, thereby improving the channel estimation performance.

Figure 4:
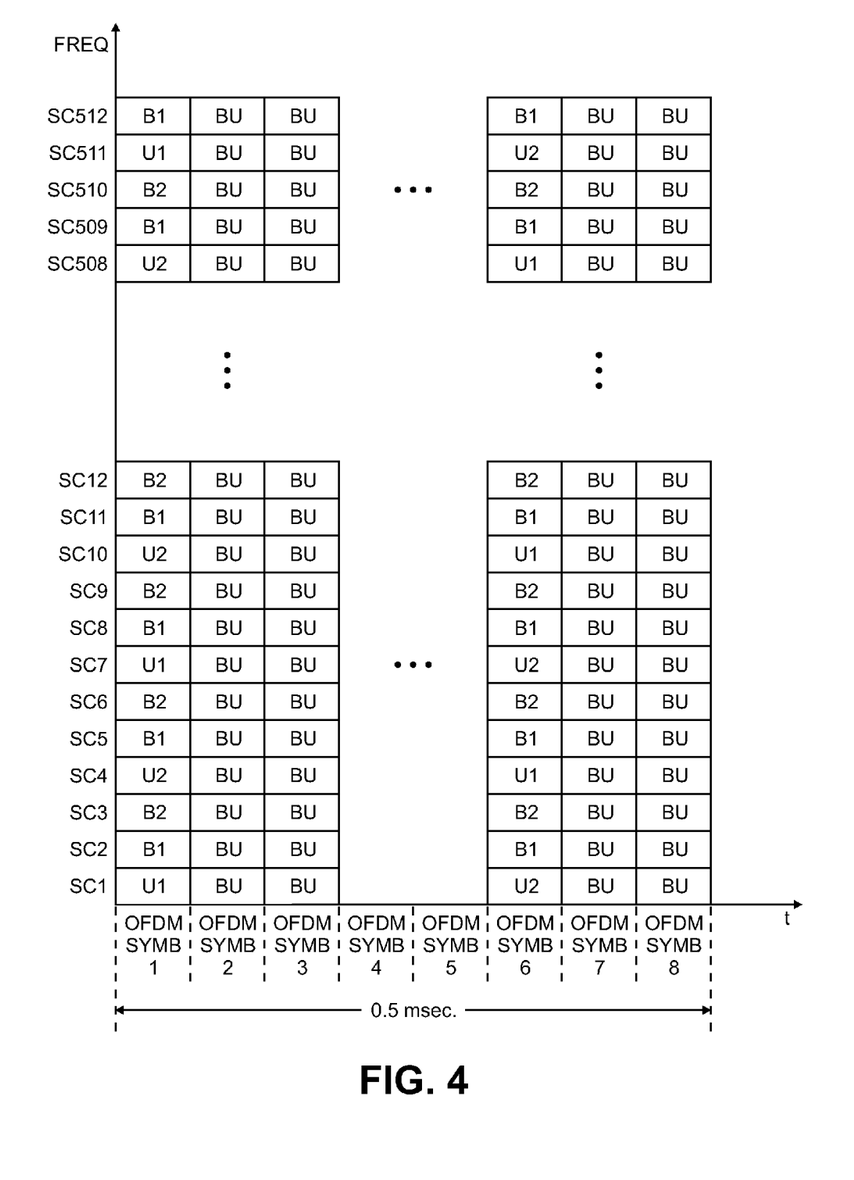
FIG. 4 illustrates a selected portion of a downlink subframe according to one embodiment of the disclosure.

FIG. 4 illustrates a selected portion of a downlink subframe according to one embodiment of the disclosure. By way of example and not by way of limitation, eight OFDM symbols, labeled OFDM Symbol 1 through OFDM Symbol 8, are transmitted in eight time slots over a 5 millisecond time period. Each OFDM symbol comprises 512 subcarriers (or tones), labeled SC1 through SC 512. In alternate embodiments, each OFDM symbol may comprise more than, or less than, 512 subcarriers. The eight time slots in which the eight representative OFDM symbols are transmitted may be part of a transmission time interval (TTI) in the downlink subframe (SF).

As FIG. 4 illustrates, each subcarrier of each OFDM symbol is used to transmit a unicast pilot signal, a broadcast pilot signal, or superimposed broadcast and unicast data traffic. FIG. 4 represents the composite transmissions from both antenna ANT1 and ANT2. In FIG. 4, the label "U1" indicates a unicast pilot signal to be transmitted from antenna ANT1, the label "U2" indicates a unicast pilot signal to be transmitted from antenna ANT2, the label "B1" indicates a broadcast pilot signal to be transmitted from antenna ANT1, the label "B2" indicates a broadcast pilot signal to be transmitted from antenna ANT2, and the label "BU" indicates superimposed unicast and broadcast user data traffic to be transmitted from either antenna ANT1 or ANT2.

In FIG. 4, the reference symbols (i.e., broadcast and unicast pilots) are located in OFDM Symbol 1 and in OFDM Symbol 6 of every sub-frame assigned for downlink transmission. In alternate embodiments, other OFDM symbols may be used. The unicast pilots from each transmit antenna use every $6^{th}$ subcarrier of each OFDM symbol. Thus, in OFDM Symbol 1, the U1 unicast pilot signal uses subcarriers SC1, SC7, SC13, etc. and the U2 unicast pilot signal uses subcarriers SC4, SC10, SC16, etc. In OFDM Symbol 6, the U1 and U2 unicast pilot signals switch positions in the subcarriers. Thus, the U2 unicast pilot signal uses subcarriers SC1, SC7, SC13, etc. and the U1 unicast pilot signal uses subcarriers SC4, SC10, SC16, etc. The broadcast pilot signals use every $3^{rd}$ subcarrier. Thus, the B1 broadcast pilot signal uses subcarriers SC2, SC5, SC8, etc. in OFDM Symbols 1 and 6 and the B2 broadcast pilot signal uses subcarriers SC3, SC6, SC8, etc. in OFDM Symbols 1 and 6.

In general, a higher density is required in the frequency domain for the broadcast traffic due to the relatively larger delay spread and the frequency selectivity experienced in a single-frequency network (SFN) operation.

As noted above, FIG. 4 represents the composite transmissions from both antenna ANT1 and ANT2. The unicast traffic and broadcast traffic are superimposed (BU) and use the same set of subcarriers. However, it should be noted that with orthogonal reference signals for broadcast and unicast, the subcarriers used for pilot transmissions from one antenna are left blank on the other transmit antennas. By way of example, in OFDM Symbol 1, antenna ANT1 transmits the U1 unicast pilot signal in subcarrier SC1 and transmits the B1 broadcast pilot signal in subcarrier SC2, but transmits nothing in subcarrier SC3 and subcarrier SC4. Correspondingly, in OFDM Symbol 1, antenna ANT2 transmits nothing in subcarrier SC1 and subcarrier SC2 (when antenna ANT1 transmits), but transmits the B2 broadcast pilot signal in subcarrier SC3 and transmits the U2 unicast pilot signal in subcarrier SC4 (when antenna ANT1 is silent).

In this way, the pilot signals do not see any interference from the same cell and therefore the reliability of channel estimates may be improved. For SFN broadcast with broadcast pilot signals transmitted orthogonally to unicast pilot signals and also orthogonally to superimposed broadcast and unicast traffic, the only interference comes from background noise. This improves the broadcast pilot SNR and therefore improves the channel estimation performance for the broadcast traffic. It should be noted that when broadcast and unicast traffic are superimposed and share the same subcarrier resources, the broadcast traffic is interfered from the unicast traffic. However, the broadcast pilot signals using orthogonal subcarrier resources are not interfered by the unicast traffic.

Figure 5:
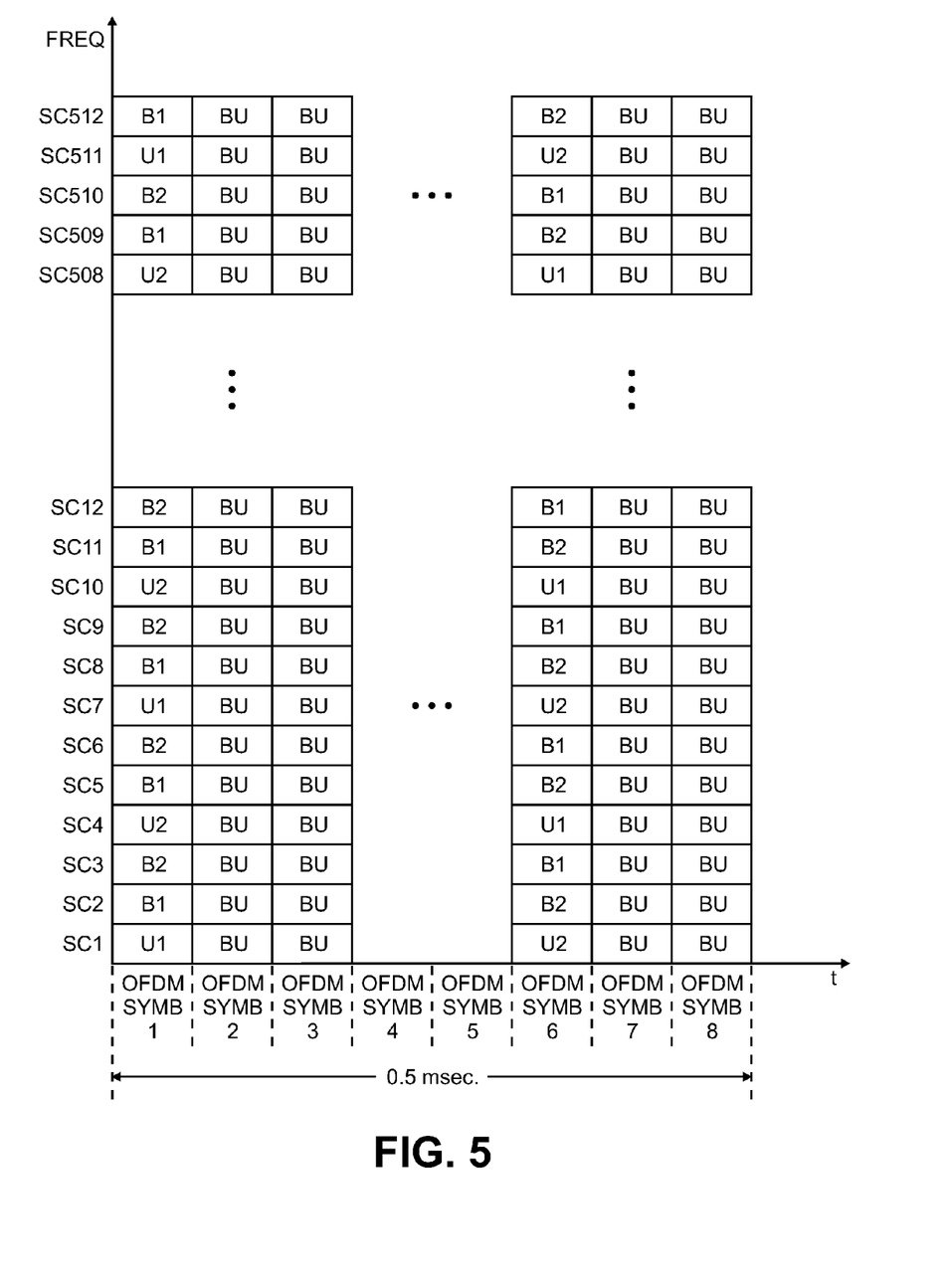
FIG. 5 illustrates a selected portion of a downlink subframe according to another embodiment of the disclosure.

FIG. 5 illustrates a selected portion of a downlink subframe according to another embodiment of the disclosure. FIG. 5 is similar in many respects to FIG. 4. However, unlike FIG. 4, the broadcast pilot signals transmitted in OFDM Symbol 6 are staggered relative to the broadcast pilot signals transmitted in OFDM Symbol 1. By way of example, in OFDM Symbol 1, the B1 broadcast pilot signal uses subcarrier SC2 and the B2 broadcast pilot signal uses subcarrier SC3. However, in OFDM Symbol 6, the BE broadcast pilot signal uses subcarrier SC3 and the B2 broadcast pilot signal uses subcarrier SC2.

The subcarriers used to transmit superimposed unicast and broadcast data traffic are labeled "BU" in FIGS. 4 and 5. However, for ease of illustration and clarity of explanation, the subcarriers used to transmit superimposed unicast and broadcast data traffic are left blank in FIG. 6-10, hereafter.

Figure 6:
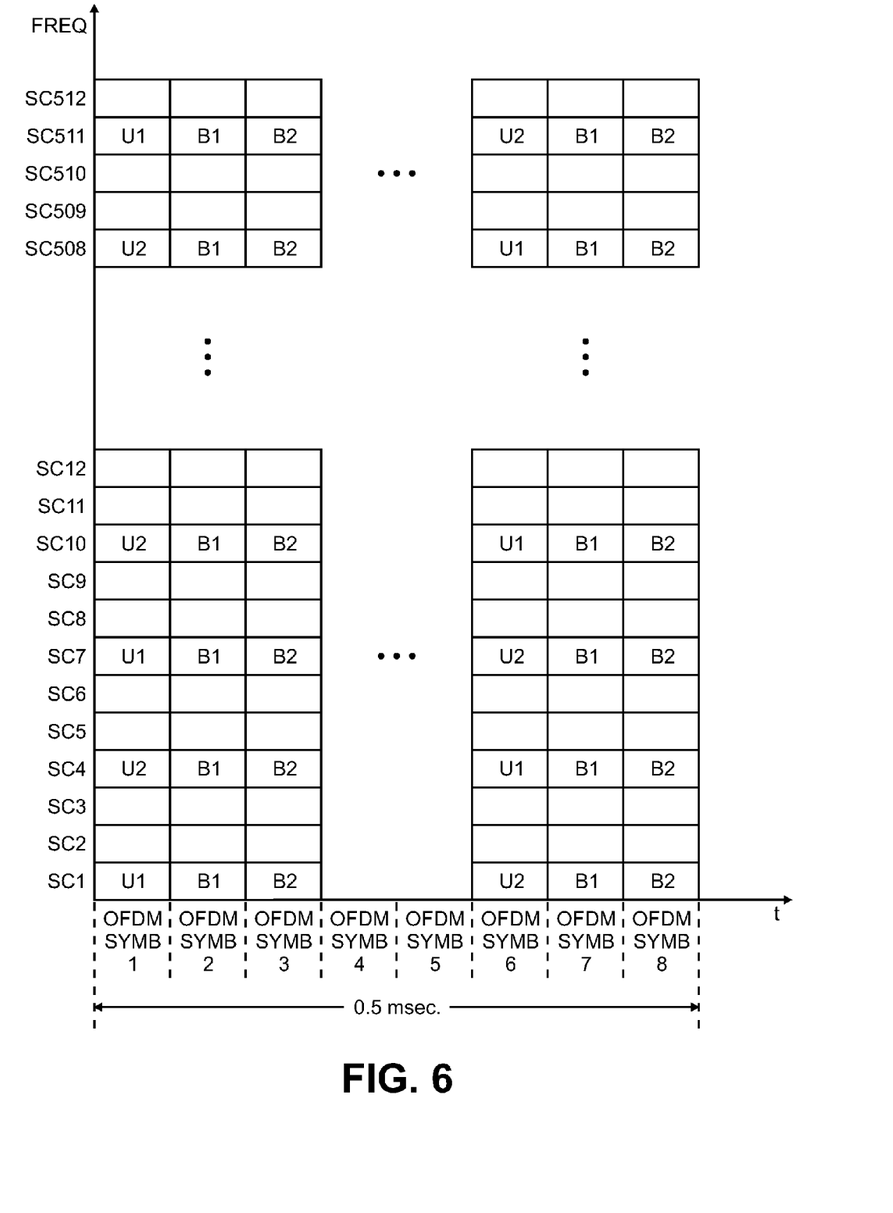
FIG. 6 illustrates a selected portion of a downlink subframe according to still another embodiment of the disclosure.

FIG. 6 illustrates a selected portion of a downlink subframe according to still another embodiment of the disclosure. In FIG. 6, the B1 and B2 broadcast pilot signals are transmitted in OFDM symbols orthogonal in time to the OFDM symbols used for the U1 and U2 unicast pilot signals. By way of example, the U1 unicast pilot signal is transmitted in subcarrier SC1 of OFDM Symbols 1 and 6, the B1 broadcast pilot signal is transmitted in subcarrier SC1 of OFDM Symbols 2 and 7, and the B2 broadcast pilot signal is transmitted in subcarrier SC1 of OFDM Symbols 3 and 8. This results in frequency multiplexing of the broadcast pilot signals and the superimposed broadcast and unicast data traffic. This frequency-multiplexing approach allows for transmit power balancing between broadcast pilots and superimposed broadcast and unicast traffic.

Figure 7:
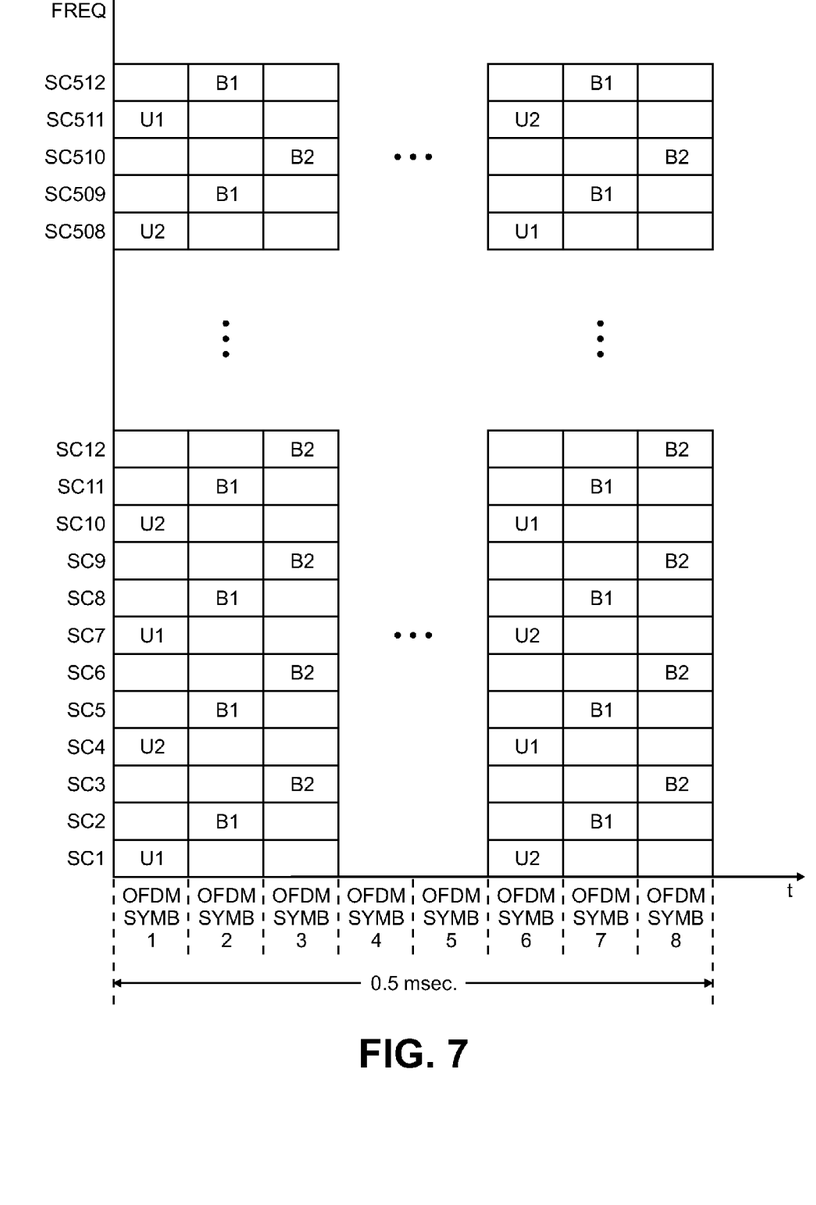
FIG. 7 illustrates a selected portion of a downlink subframe according to yet another embodiment of the disclosure.

FIG. 7 illustrates a selected portion of a downlink subframe according to yet another embodiment of the disclosure. In FIG. 7, the broadcast pilot signals are transmitted in OFDM symbols orthogonal in time to the OFDM symbols used for the unicast pilot signals. The broadcast pilot signals are also staggered in orthogonal subcarriers relative to the unicast pilot signals and to each other. By way of example, the U1 unicast pilot signal is transmitted in subcarrier SC1 of OFDM Symbols 1 and 6, the B1 broadcast pilot signal is transmitted in subcarrier SC2 of OFDM Symbols 2 and 7, and the B2 broadcast pilot signal is transmitted in subcarrier SC3 of OFDM Symbols 3 and 8. This also results in frequency multiplexing of broadcast pilots and superimposed broadcast and unicast traffic. This frequency-multiplexing approach allows for transmit power balancing between broadcast pilots and superimposed broadcast and unicast traffic.

Figure 8:
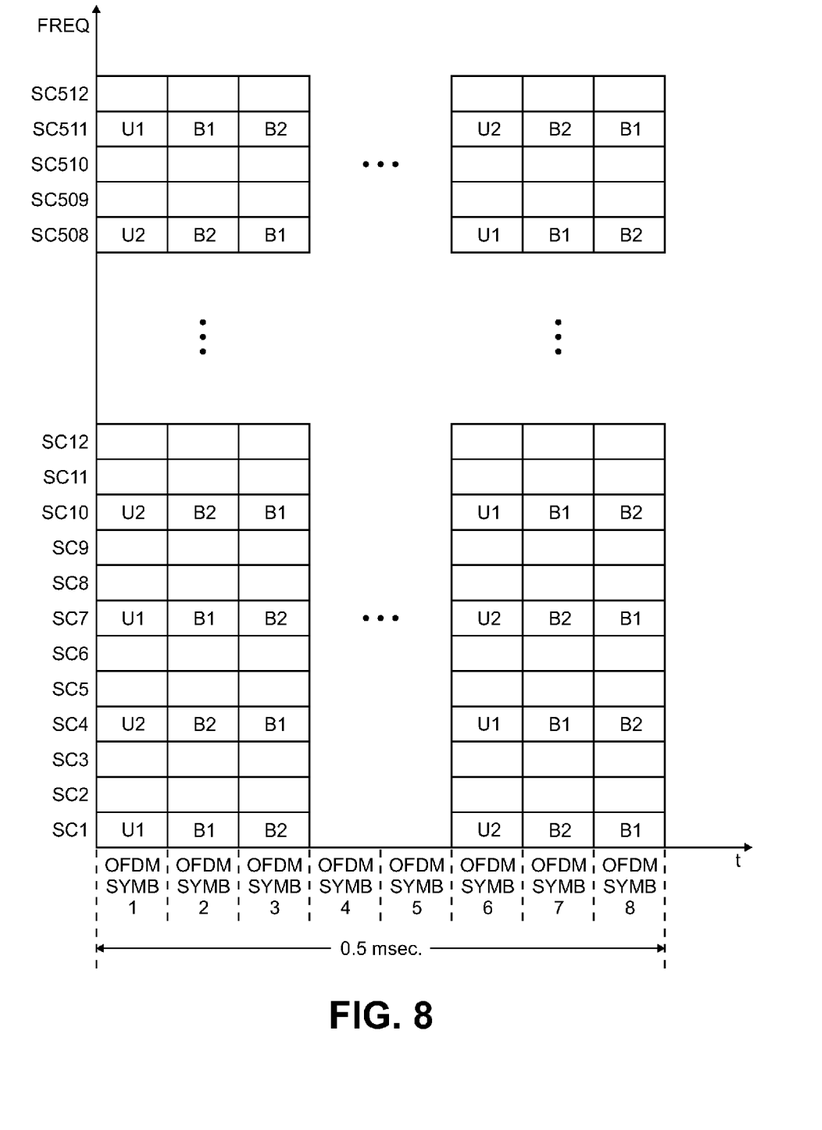
FIG. 8 illustrates a selected portion of a downlink subframe according to an embodiment of the present disclosure.

FIG. 8 illustrates a selected portion of a downlink subframe according to an embodiment of the present disclosure. In FIG. 8, the broadcast pilot signals are transmitted in OFDM symbols orthogonal in time to OFDM symbols used for the unicast pilot signals, similar to FIG. 6. However, in FIG. 8, unlike FIG. 6, broadcast pilot signals for ANT1 and ANT2 are transmitted in different subcarriers within the same OFDM symbol. By way of example, the B1 broadcast pilot signal uses every sixth subcarrier (i.e., SC1, SC7, . . . ) of OFDM Symbol 2 and B2 broadcast pilot signal uses every sixth subcarrier (i.e., SC4, SC10, . . . ) of OFDM Symbol 2. In OFDM Symbol 3, the B1 and B2 broadcast pilot signals switch subcarriers relative to OFDM Symbol 2. This approach allows further balancing of the transmit power between the broadcast pilot signals for the two antennas.

Figure 9:
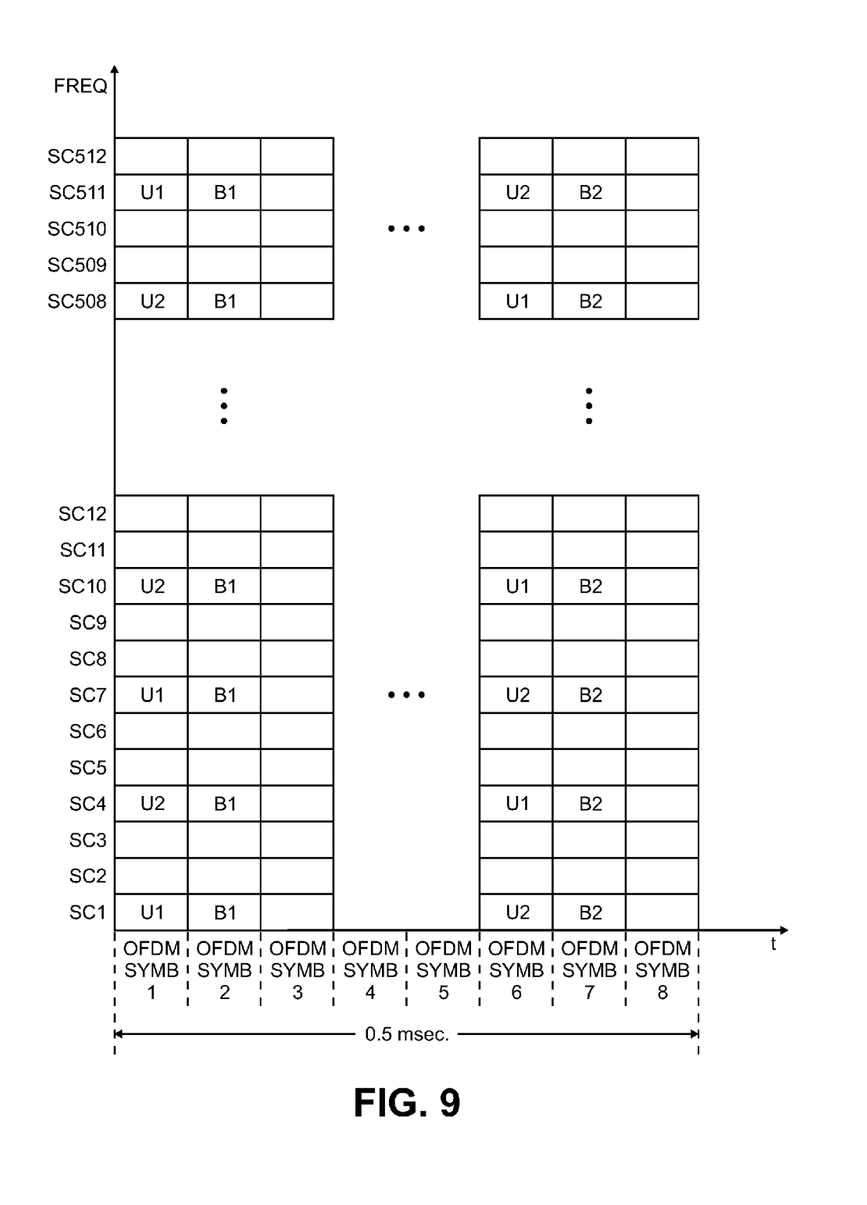
FIG. 9 illustrates a selected portion of a downlink subframe according to one embodiment of the disclosure.

FIG. 9 illustrates a selected portion of a downlink subframe according to one embodiment of the disclosure. In FIG. 9, the B1 broadcast pilot signals for antenna ANT1 are transmitted on every third subcarrier in OFDM Symbol 2 only, while the B2 broadcast pilot signals for antenna ANT2 are transmitted on every third subcarrier in OFDM Symbol 7 only. This approach results in reduced overhead for the broadcast pilots.

Figure 10:
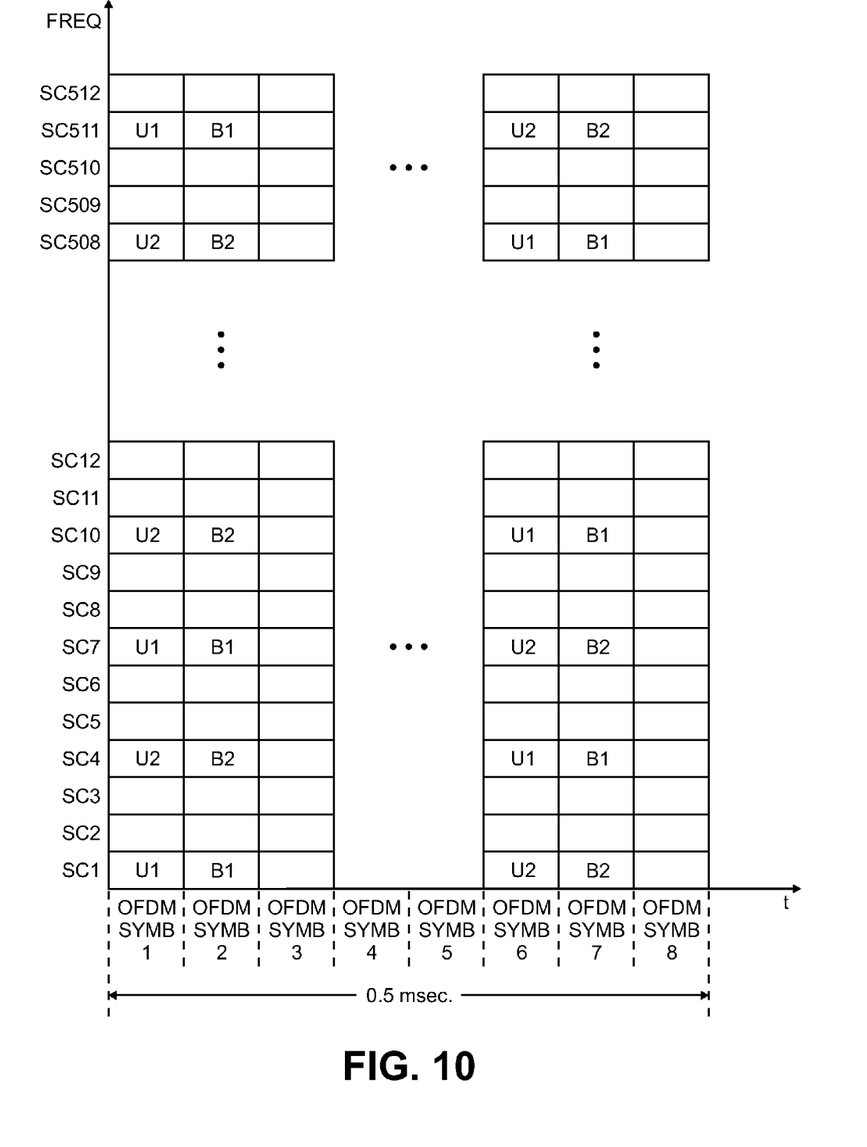
FIG. 10 illustrates a selected portion of a downlink subframe according to another embodiment of the disclosure.

FIG. 10 illustrates a selected portion of a downlink subframe according to another embodiment of the disclosure. In FIG. 10, the broadcast pilots for antennas ANT1 and ANT2 use different subcarriers within the same OFDM symbol. Thus, the B1 and B2 broadcast pilot signals alternate every third subcarrier in OFDM Symbols 2 and 7. This approach allows balancing the transmit power between the broadcast pilots for antennas ANT1 and ANT2. This approach also results in reduced overhead for the broadcast pilots.

Figure 11:
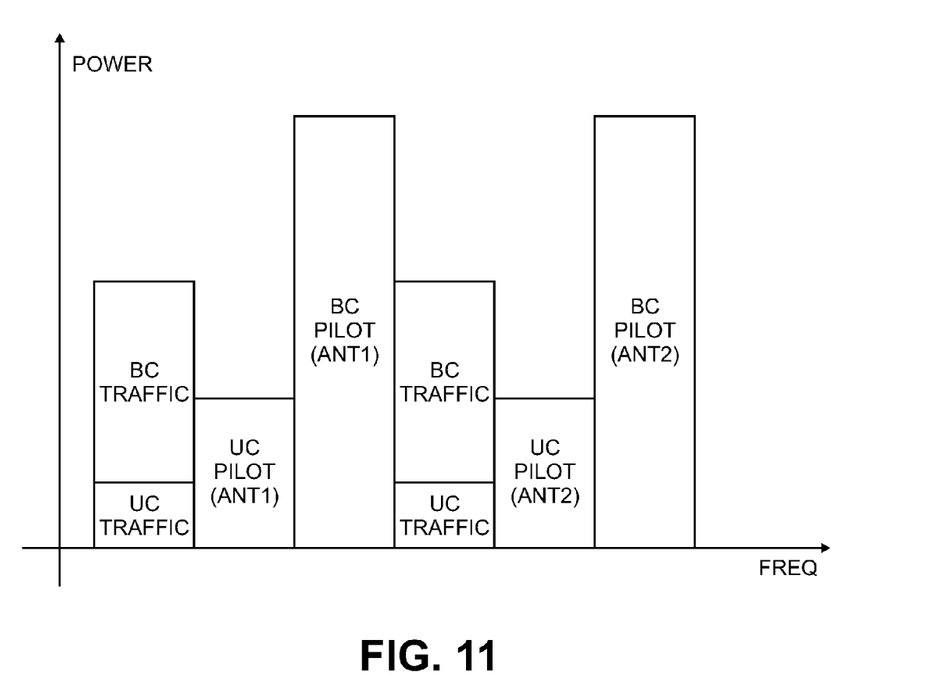
FIG. 11 illustrates a power spectral density of a wireless network according to the principles of the present disclosure.

FIG. 11 illustrates a power spectral density of wireless network 100 according to the principles of the present disclosure. In FIG. 11, the transmit power levels for the broadcast (BC) pilot signals on antennas ANT1 and ANT2 are boosted relative to the superimposed broadcast and unicast traffic and also relative to the unicast (UC) pilot signals on antennas ANT1 and ANT2. This may be accomplished by selectively adapting the gain factors G1-G6 in FIG. 2, so that different power settings are used for the subcarriers used for broadcast pilot transmission.

As noted above, the B1 and B2 broadcast pilot signals are transmitted orthogonally to the superimposed broadcast and unicast data traffic and also orthogonally to the U1 and U2 unicast pilot signals in frequency. This is true in the two (2) antenna examples described above and also in alternate embodiments in which more than two transmit antennas are used. Hence, in a single-frequency network (SFN) environment, the broadcast pilot signals see no interference apart from background noise. This enables very high symbol SNR for the broadcast pilots and hence very reliable channel estimates for demodulation and decoding of the broadcast traffic.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in an orthogonal frequency division multiplexing (OFDM) wireless network that communicates with subscriber stations in a coverage area of the OFDM wireless network, a base station for transmitting broadcast data and unicast data to the subscriber stations from a plurality of antennas using multiple-input, multiple-output (MIMO) techniques,
  wherein the base station transmits in a first OFDM symbol a first broadcast pilot signal from a first antenna, a first unicast pilot signal transmitted from the first antenna, a second unicast pilot signal transmitted from a second antenna, and a second broadcast pilot signal transmitted from the second antenna;
  wherein the base station transmits in a second OFDM symbol superimposed broadcast data traffic and unicast data traffic transmitted from the first and second antennas, and
  wherein subcarriers in the first OFDM symbol used to carry each of the first broadcast pilot signal, the first unicast pilot signal, the second unicast pilot signal, and the second broadcast pilot signal are different than subcarriers in the second OFDM symbol used to carry each of the first broadcast pilot signal, the first unicast pilot signal, the second unicast pilot signal, and the second broadcast pilot signal.

2. The base station as set forth in claim 1, wherein the base station transmits the first broadcast pilot signal on a first set of subcarriers associated with the first OFDM symbol and transmits the first unicast pilot signal on a second set of subcarriers associated with the first OFDM symbol, wherein the first set of subcarriers are orthogonal to the second set of subcarriers.

3. The base station as set forth in claim 2, wherein the base station transmits the second unicast pilot signal on a third set of subcarriers associated with the first OFDM symbol, wherein the third set of subcarriers are orthogonal to the first and second sets of subcarriers.

4. The base station as set forth in claim 3, wherein the base station transmits the second broadcast pilot signal on a fourth set of subcarriers associated with the first OFDM symbol, wherein the fourth set of subcarriers are orthogonal to the first, second, and third sets of subcarriers.

5. The base station as set forth in claim 1, wherein the base station transmits in a third OFDM symbol the first broadcast pilot signal, the first unicast pilot signal, the second unicast pilot signal, and the second broadcast pilot signal, wherein the first, second, and third OFDM symbols are part of the same OFDM subframe.

6. The base station as set forth in claim 1, wherein a number of subcarriers that transmit the first broadcast pilot signal in the first OFDM symbol is twice as large as a number of subcarriers that transmit the first unicast pilot signal in the first OFDM symbol.

7. The base station as set forth in claim 1, wherein a number of subcarriers that transmit the second broadcast pilot signal in the first OFDM symbol is twice as large as a number of subcarriers that transmit the first unicast pilot signal in the first OFDM symbol.

8. The base station as set forth in claim 1, wherein the base station transmits the first broadcast pilot signal at a higher power level than at least one of the first unicast pilot signal, the second unicast pilot signal, and the superimposed broadcast data traffic and unicast data traffic.

9. An orthogonal frequency division multiplexing (OFDM) wireless network comprising a plurality of base stations capable of communicating with a plurality of subscriber stations in a coverage area of the OFDM network, wherein each of the plurality of base stations transmits broadcast data and unicast data to the subscriber stations from a plurality of antennas using multiple-input, multiple-output (MIMO) techniques and
  wherein each base station transmits in a first OFDM symbol a first broadcast pilot signal from a first antenna, a first unicast pilot signal transmitted from the first antenna, a second unicast pilot signal transmitted from a second antenna, and a second broadcast pilot signal transmitted from the second antenna;
  wherein each base station transmits in a second OFDM symbol superimposed broadcast data traffic and unicast data traffic transmitted from the first and second antennas, and
  wherein subcarriers in the first OFDM symbol used to carry each of the first broadcast pilot signal, the first unicast pilot signal, the second unicast pilot signal, and the second broadcast pilot signal are different than subcarriers in the second OFDM symbol used to carry each of the first broadcast pilot signal, the first unicast pilot signal, the second unicast pilot signal, and the second broadcast pilot signal.

10. The OFDM wireless network as set forth in claim 9, wherein the each base station transmits the first broadcast pilot signal on a first set of subcarriers associated with the first OFDM symbol and transmits the first unicast pilot signal on a second set of subcarriers associated with the first OFDM symbol, wherein the first set of subcarriers are orthogonal to the second set of subcarriers.

11. The OFDM wireless network as set forth in claim 10, wherein the each base station transmits the second unicast pilot signal on a third set of subcarriers associated with the first OFDM symbol, wherein the third set of subcarriers are orthogonal to the first and second sets of subcarriers.

12. The OFDM wireless network as set forth in claim 11, wherein the each base station transmits the second broadcast pilot signal on a fourth set of subcarriers associated with the first OFDM symbol, wherein the fourth set of subcarriers are orthogonal to the first, second, and third sets of subcarriers.

13. The OFDM wireless network as set forth in claim 9, wherein the each base station transmits in a third OFDM symbol the first broadcast pilot signal, the first unicast pilot signal, the second unicast pilot signal, and the second broadcast pilot signal, wherein the first, second, and third OFDM symbols are part of the same OFDM subframe.

14. The OFDM wireless network as set forth in claim 9, wherein a number of subcarriers that transmit the first broadcast pilot signal in the first OFDM symbol is twice as large as a number of subcarriers that transmit the first unicast pilot signal in the first OFDM symbol.

15. The OFDM wireless network as set forth in claim 9, wherein a number of subcarriers that transmit the second broadcast pilot signal in the first OFDM symbol is twice as large as a number of subcarriers that transmit the first unicast pilot signal in the first OFDM symbol.

16. The OFDM wireless network as set forth in claim 9, wherein the each base station transmits the first broadcast pilot signal at a higher power level than at least one of the first unicast pilot signal, the second unicast pilot signal, and the superimposed broadcast data traffic and unicast data traffic.

17. For use in a base station of an orthogonal frequency division multiplexing (OFDM) wireless network that communicates with subscriber stations, a method of transmitting broadcast data and unicast data from the base station to the subscriber stations from a plurality of antennas using multiple-input, multiple-output (MIMO) techniques, the method comprising the steps of:

transmitting in a first OFDM symbol a first broadcast pilot signal from a first antenna, a first unicast pilot signal transmitted from the first antenna, a second unicast pilot signal transmitted from a second antenna, and a second broadcast pilot signal transmitted from the second antenna;

transmitting, in a second OFDM symbol, superimposed broadcast data traffic and unicast data traffic transmitted from the first and second antennas, and wherein subcarriers in the first OFDM symbol used to carry each of the first broadcast pilot signal, the first unicast pilot signal, the second unicast pilot signal, and the second broadcast pilot signal are different than subcarriers in the second OFDM symbol used to carry each of the first broadcast pilot signal, the first unicast pilot signal, the second unicast pilot signal, and the second broadcast pilot signal.

18. The method as set forth in claim 17, wherein the first broadcast pilot signal is transmitted on a first set of subcarriers associated with the first OFDM symbol and the first unicast pilot signal is transmitted on a second set of subcarriers associated with the first OFDM symbol, wherein the first set of subcarriers are orthogonal to the second set of subcarriers.

19. The method as set forth in claim 18, wherein the second unicast pilot signal is transmitted on a third set of subcarriers associated with the first OFDM symbol, wherein the third set of subcarriers are orthogonal to the first and second sets of subcarriers.

20. The method as set forth in claim 19, wherein the second broadcast pilot signal is transmitted on a fourth set of subcarriers associated with the first OFDM symbol, wherein the fourth set of subcarriers are orthogonal to the first, second, and third sets of subcarriers.

21. The method as set forth in claim 17, further comprising the step of:

transmitting in a third OFDM symbol the first broadcast pilot signal, the first unicast pilot signal, the second unicast pilot signal, and the second broadcast pilot signal, wherein the first, second, and third OFDM symbols are part of the same OFDM subframe.

22. The method as set forth in claim 17, wherein a number of subcarriers that transmit the first broadcast pilot signal in the first OFDM symbol is twice as large as a number of subcarriers that transmit the first unicast pilot signal in the first OFDM symbol.

23. The method as set forth in claim 17, wherein a number of subcarriers that transmit the second broadcast pilot signal in the first OFDM symbol is twice as large as a number of subcarriers that transmit the first unicast pilot signal in the first OFDM symbol.

24. The method as set forth in claim 17, wherein the first broadcast pilot signal is transmitted at a higher power level than at least one of the first unicast pilot signal, the second unicast pilot signal, and the superimposed broadcast data traffic and unicast data traffic.

25. For use in an orthogonal frequency division multiplexing (OFDM) wireless network, a subscriber station capable of receiving broadcast data and unicast data transmitted by a base station from a plurality of antennas using multiple-input, multiple-output (MIMO) techniques, wherein the subscriber station receives and detects in a first OFDM symbol:

i) a first broadcast pilot signal transmitted from a first antenna of the base station;

ii) a first unicast pilot signal transmitted from the first antenna of the base station; iii) a second unicast pilot signal transmitted from a second antenna of the base station; and iv) a second broadcast pilot signal transmitted from the second antenna of the base station;

wherein the subscriber station receives and detects in a second OFDM symbol superimposed broadcast data traffic and unicast data traffic transmitted from the first and second antennas of the base station, and wherein subcarriers in the first OFDM symbol used to carry each of the first broadcast pilot signal, the first unicast pilot signal, the second unicast pilot signal, and the second broadcast pilot signal are different than subcarriers in the second OFDM symbol used to carry each of the first broadcast pilot signal, the first unicast pilot signal, the second unicast pilot signal, and the second broadcast pilot signal.

* * * * *